US009575088B2

(12) United States Patent
Liukku et al.

(10) Patent No.: US 9,575,088 B2
(45) Date of Patent: Feb. 21, 2017

(54) CAPACITIVE MICROMECHANICAL ACCELERATION SENSOR

(71) Applicant: Murata Manufacturing Co., Ltd., Kyoto (JP)

(72) Inventors: Matti Liukku, Helsinki (FI); Ville-Pekka Rytkönen, Klaukkala (FI); Anssi Blomqvist, Helsinki (FI)

(73) Assignee: MURATA MANUFACTURING CO., LTD., Nagaokakyo-shi, Kyoto (JP)

( * ) Notice: Subject to any disclaimer, the term of this patent is extended or adjusted under 35 U.S.C. 154(b) by 272 days.

(21) Appl. No.: 14/317,575

(22) Filed: Jun. 27, 2014

(65) Prior Publication Data
US 2015/0000403 A1 Jan. 1, 2015

(30) Foreign Application Priority Data

Jun. 28, 2013 (FI) ..................... 20135714

(51) Int. Cl.
*G01P 15/18* (2013.01)
*G01P 15/125* (2006.01)
(Continued)

(52) U.S. Cl.
CPC .............. *G01P 15/18* (2013.01); *G01P 15/125* (2013.01); *G01P 15/00* (2013.01); *G01P 15/08* (2013.01);
(Continued)

(58) Field of Classification Search
CPC ......... G01P 15/18; G01P 15/125; G01P 15/00; G01P 15/08; G01P 5/24; G01P 5/241
(Continued)

(56) References Cited

U.S. PATENT DOCUMENTS 7,430,909 B2 10/2008 Adams et al.
8,333,113 B2 12/2012 Classen et al.
(Continued)

FOREIGN PATENT DOCUMENTS

DE 197 50 350 C1 8/1999
WO 2004/081583 A1 9/2004

OTHER PUBLICATIONS

International Search Report application No. PCT/IB2014/062649 dated Oct. 14, 2014.
(Continued)

*Primary Examiner* — Daniel J Colilla
*Assistant Examiner* — Quang X Nguyen
(74) *Attorney, Agent, or Firm* — Squire Patton Boggs (US) LLP

(57) ABSTRACT

The invention relates to a capacitive micromechanical acceleration sensor comprising a first sensor, a second sensor, and a third sensor. The first sensor comprises a rotor electrode and stator electrode. The sensor comprises a first beam that is connected to a rotor electrode support structure and that is connected to the rotor electrode. The sensor comprises a second beam that is connected to the rotor electrode support structure and that is connected to the rotor electrode. The second sensor is situated in a first space circumscribed by the first beam, the first sensor, and the rotor electrode support structure. The third sensor is situated in a second space circumscribed by the second beam, the first sensor, and the rotor electrode support structure.

33 Claims, 10 Drawing Sheets

(51) Int. Cl.
G01P 15/00 (2006.01)
G01P 15/08 (2006.01)

(52) U.S. Cl.
CPC .................. *G01P 2015/0828* (2013.01); *G01P 2015/0837* (2013.01)

(58) Field of Classification Search
USPC .......................................................... 73/510
See application file for complete search history.

(56) References Cited

U.S. PATENT DOCUMENTS

| | | |
|---|---|---|
| 2005/0109108 A1 | 5/2005 | Chen |
| 2007/0119252 A1* | 5/2007 | Adams ................ G01P 15/0802 73/510 |
| 2009/0139330 A1 | 6/2009 | Pavelescu et al. |
| 2011/0023606 A1 | 2/2011 | Burghardt et al. |
| 2012/0000287 A1 | 1/2012 | Frangi et al. |

OTHER PUBLICATIONS

Finnish Search Report dated Apr. 25, 2014 corresponding to Finnish Patent Application No. 20135714.

* cited by examiner

CAPACITIVE MICROMECHANICAL ACCELERATION SENSOR

BACKGROUND

Field

The present invention relates to capacitive MEMS, micro-electro-mechanical systems acceleration sensors.

Description of the Related Art

Publication U.S. Pat. No. 7,430,909 presents a tri-axis acceleration sensor. In an embodiment of this tri-axis acceleration sensor there is provided a micro-electromechanical (MEMS) acceleration sensor, including a substrate, a first sensor and a second sensor. The first sensor is configured to measure acceleration along a first axis parallel to a plane of the substrate. The second sensor is configured to measure acceleration along an axis perpendicular to the plane of the substrate. The second sensor comprises a first beam, a second beam and a single support structure. The single support structure supports the first and second beams relative to the substrate, wherein the first and second beams circumscribe the first sensor.

SUMMARY

The object of the invention is to provide a capacitive micromechanical tri-axis acceleration sensor that is both mechanically robust against external stresses and vibrations and small in size.

In the capacitive micromechanical acceleration sensor the first spring structure for movably anchoring the rotor electrode of the first sensor at the substrate and the second spring structure for movably anchoring the rotor electrode of the first sensor at the substrate are located as far from each other as possible. A result of this is that the capacitive micromechanical acceleration sensor is more robust to external vibrations and the frequency difference between measurement mode and the first parasitic mode is maximized. The first spring structure and the second spring structure are additionally located as far from the signal generating rotor electrode of the first sensor as possible to maximize moment of inertia in measurement mode torsional movement. This leads to the result that less mass is needed for achieving adequate deflection of the rotor electrode of the first sensor with respect to the stator electrode(s) of the first sensor and that the capacitive micromechanical acceleration sensor is more sensitive to acceleration.

In the capacitive micromechanical acceleration sensor all mass of the rotor electrode of the first sensor is signal generating asymmetric mass. This means that no mass of the rotor electrode of the first sensor is located on the other side of the spring axis. Such construction leads to smaller sensor area and to a cheaper capacitive micromechanical acceleration sensor.

In a preferred embodiment of the capacitive micromechanical acceleration sensor all anchors i.e. the rotor anchor(s) for anchoring the rotor electrode(s) of the first sensor movably to the substrate and the stator anchor(s) for rigidly anchoring the stator electrode(s) of the first sensor to the substrate are located essentially in one and the same location or essentially adjacent to each other. Such anchoring causes mechanical stresses to move the rotor electrode(s) of the first sensor and the stator electrode(s) of the first sensor in the same way. When the relational position between rotor electrode(s) and stator electrode(s) does not change the sensor output does not change either. Error from common motion of the rotor electrode(s) and the stator electrode(s) can thus be minimized.

In a preferred embodiment of the capacitive micromechanical acceleration sensor the rotor anchor(s) for anchoring the rotor electrode(s) movably to the substrate and the stator anchor(s) for rigidly anchoring the stator electrode(s) to the substrate are located close to the signal generating rotor electrode(s) and stator electrode(s). This leads to less error signal, because the error signal generated by mechanical stresses to the anchors is proportional to the movement of the rotor electrode(s) and stator electrode(s). The movement of the rotor electrode(s) and stator electrode(s) is respectively proportional to the distance from anchors to the rotor electrode(s) and stator electrode(s).

In a preferred embodiment of the capacitive micromechanical acceleration sensor the first comb structure is divided into a first comb structure section and into a second comb structure section. In such embodiment the second comb structure is arranged symmetrically with respect to the central axis of the acceleration sensor at the central axis of the acceleration sensor. In such embodiment the first comb structure section is arranged between the second comb structure and the first beam. In such embodiment the second comb structure section is arranged between the second comb structure and the second beam. Because the first comb structure is divided into a first comb structure section and into a second comb structure section and because the second comb structure is arranged symmetrically with respect to the central axis of the acceleration sensor at the central axis of the acceleration sensor and because the first comb structure section is arranged between the second comb structure and the first beam and because the second comb structure section being arranged between the second comb structure and the second beam, the result is a capacitive micromechanical acceleration sensor having a mass balanced rotor electrode with respect to the central axis of the acceleration sensor. Because the center of mass of the rotor electrode is on the central axis of the acceleration sensor, the sensor is less sensitive to external vibrations. Additionally having the majority of mass distribution of the rotor electrode close to the central axis of the acceleration sensor the moment of inertia is minimized in other modes than in the measurement mode.

BRIEF DESCRIPTION OF THE DRAWINGS

The invention will be described in more detail by referring to the figures of which

DETAILED DESCRIPTION

Figure 1:
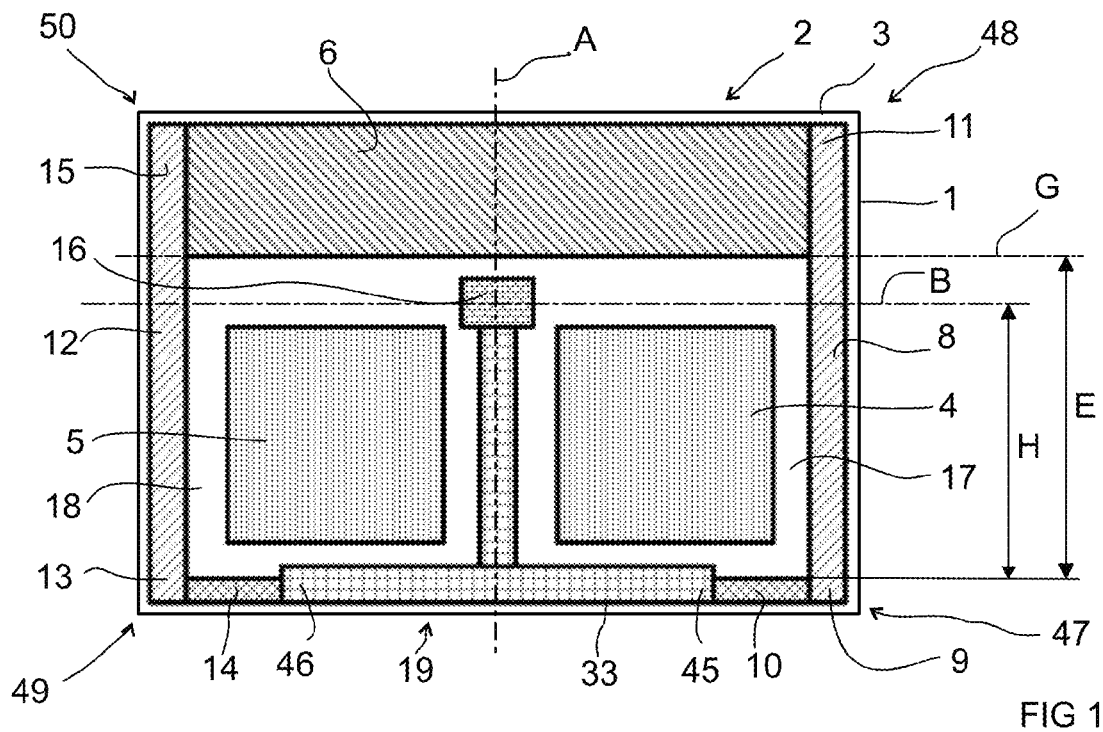
FIG. 1 is a top view of a capacitive micromechanical acceleration sensor according to a first embodiment.

The figures show examples of some embodiments of the capacitive micromechanical acceleration sensor. The capacitive micromechanical acceleration sensor may at least partly be fabricated out of a silicon substrate.

The capacitive micromechanical acceleration sensor comprises a substrate 1.

The capacitive micromechanical acceleration sensor comprises a first sensor 2 for measuring acceleration along a z-axis perpendicular to a plane 3 of the substrate 1.

The capacitive micromechanical acceleration sensor comprises additionally a second sensor 4 and a third sensor 5 for measuring accelerations in directions parallel to the plane 3 of the substrate 1. For example, the capacitive micromechanical acceleration sensor may comprise a second sensor 4 for measuring acceleration along an x-axis parallel to the plane 3 of the substrate 1, and a third sensor 5 for measuring acceleration along a y-axis that is parallel to the plane 3 of the substrate 1 and perpendicular to the x-axis. Each of the second sensor 4 and the third sensor 5 may measure acceleration along the x-axis, the y-axis or along both the x-axis and the y-axis.

The function of a capacitive micromechanical acceleration sensor is as such known in the art for example from publication U.S. Pat. No. 7,430,909, which is hereby incorporated by reference.

The first sensor 2 comprises a rotor electrode 6 and stator electrodes 7.

The stator electrode 7 may be anchored to the substrate 1 at a stator anchoring point 51; 29, 30.

The first sensor 2 comprises a first beam 8 having a first end 9 connected at a first connection point 47 by a first spring structure 10 to a rotor electrode support structure 19 that is anchored to the substrate 1 and a second end 11 that is connected at a second connection point 48 to the rotor electrode 6 of the first sensor 2.

The first sensor 2 comprises a second beam 12 having a first end 13 connected at a third connection point 49 by means of a second spring structure 14 to the rotor electrode support structure 19 that is anchored to the substrate 1 and a second end 15 that is connected at a fourth connection point 50 to the rotor electrode 6 of the first sensor 2.

The first beam 8 and the second beam 12 are parallel with a central axis A of the acceleration sensor. The central axis A is parallel to the plane 3 of the substrate 1, and perpendicular to a line between the first connection point 47 and the second connection point 49, preferably in equal distance from the first connection point 47 and the second connection point 49.

The rotor electrode support structure 19 may be rigidly anchored to the substrate 1 at a rotor anchoring point 16 that is located at a first imaginary line B perpendicular to the central axis A of the acceleration sensor in such manner that (i) the rotor electrode 6 is located touching and in relation to the first connection point 47 behind a second imaginary line G perpendicular to the central axis A of the acceleration sensor, and in such manner (ii) that a distance H between the first connection point 47 and the first imaginary line B is over 50%, preferably over 66%, of a distance E between the first connection point 47 and the second imaginary line G, when the distance H and the distance E are measured in a direction parallel with the central axis A of the acceleration sensor.

The rotor electrode support structure 19 may be rigidly anchored to the substrate 1 at a rotor anchoring point 16 that is located at a first imaginary line B perpendicular to the central axis A of the acceleration sensor in such manner that (i) the rotor electrode 6 is located touching and in relation to the first connection point 47 behind a second imaginary line G perpendicular to the central axis A of the acceleration sensor, and in such manner (ii) that a distance H between the first connection point 47 and the first imaginary line B is between 50 and 150%, preferably between 66 and 125%, more preferably between 75 and 90% of a distance E between the first connection point 47 and the second imaginary line G, when the distance H and the distance E are measured in a direction parallel with the central axis A of the acceleration sensor.

The second sensor 4 is situated in a first space 17 circumscribed by the first beam 8, the first sensor 2, the rotor electrode support structure 19, and the central axis A of the acceleration sensor The third sensor 5 is situated in a second space 18 circumscribed by the second beam 12, the first sensor 2, the rotor electrode support structure 19, and the central axis A of the acceleration sensor.

Figure 2:
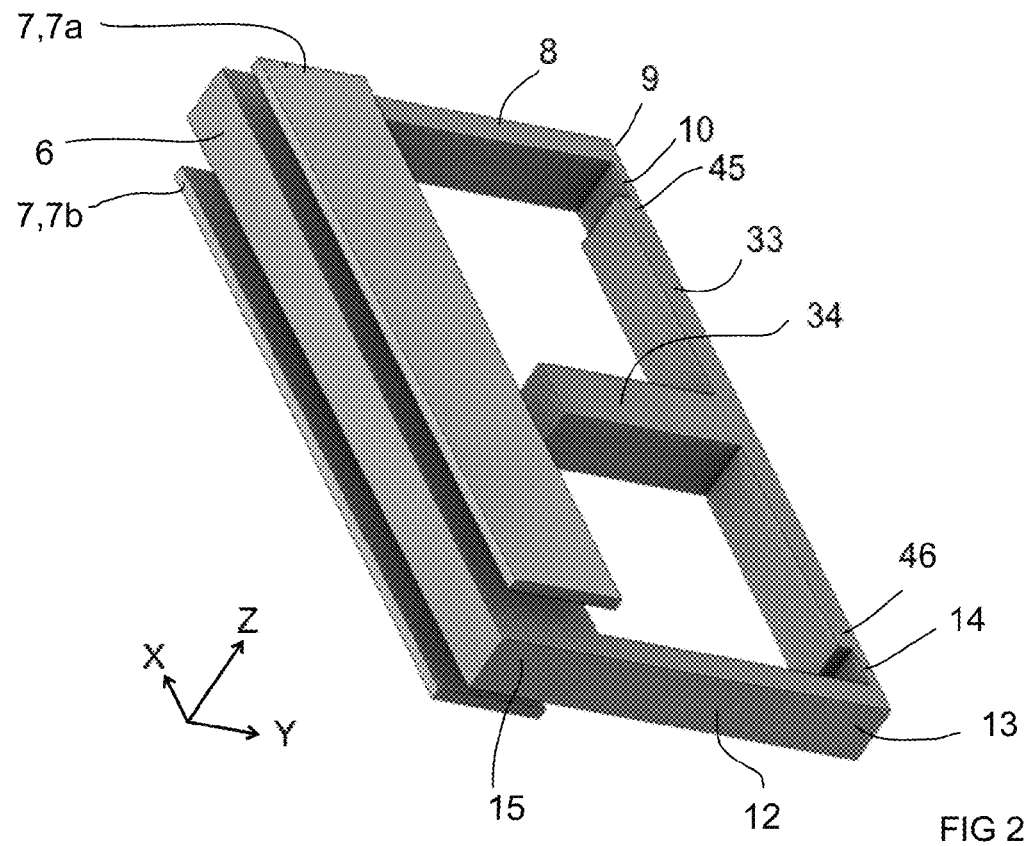
FIG. 2 shows the rotor electrode support structure, the rotor electrode and the first and the second stator electrode of the first sensor of the capacitive micromechanical acceleration sensor illustrated in FIG. 1 and additionally how the rotor electrode of first sensor is supported at the rotor electrode support structure in the capacitive micromechanical acceleration sensor illustrated in FIG. 1.
Figure 3:
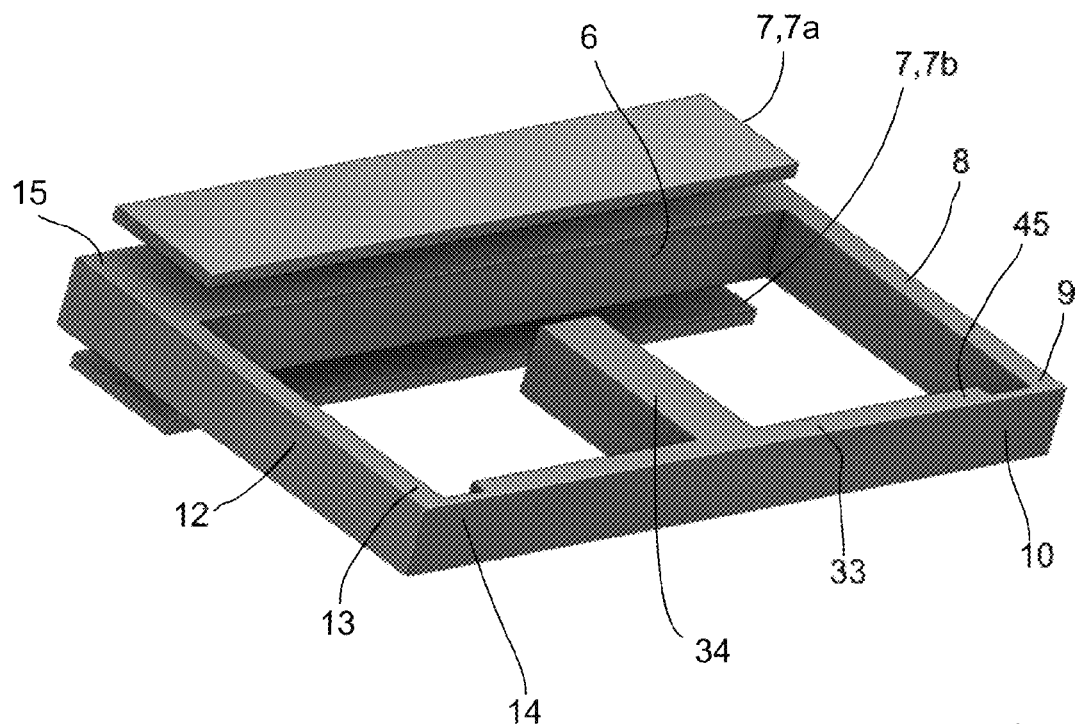
FIG. 3 shows the rotor electrode support structure, the rotor electrode and the first and the second stator electrode of the first sensor of the capacitive micromechanical acceleration sensor illustrated in FIG. 1 and additionally how the rotor electrode of first sensor is supported at the rotor electrode support structure in the capacitive micromechanical acceleration sensor illustrated in FIG. 1.
Figure 4:
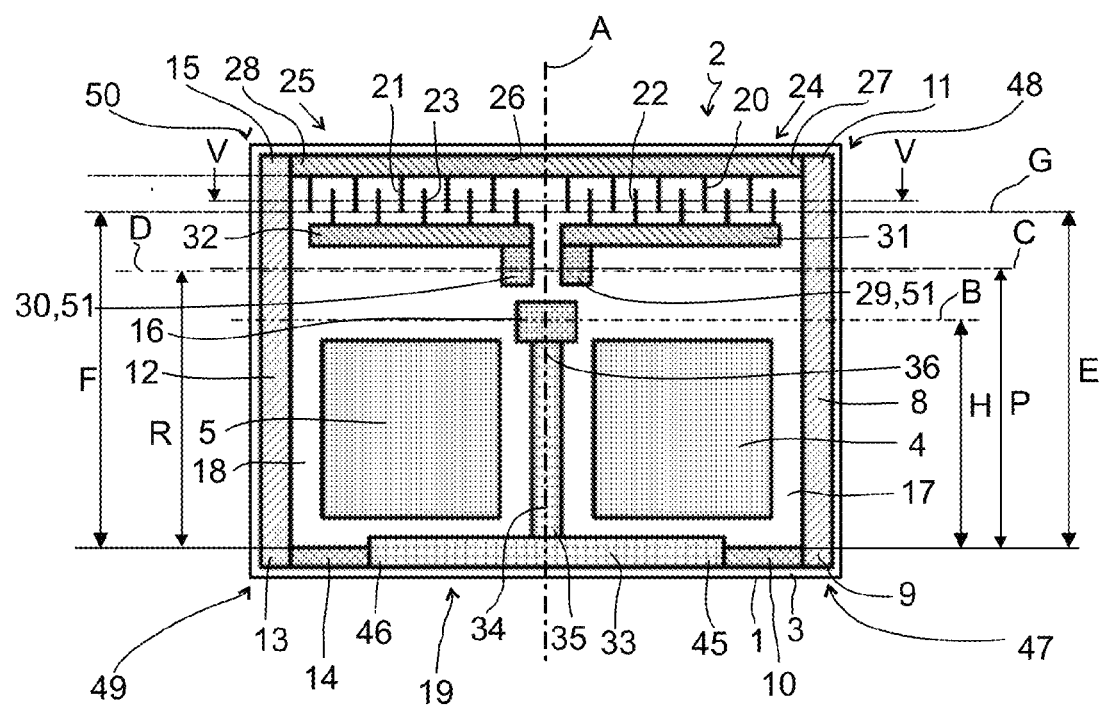
FIG. 4 is a top view of a capacitive micromechanical acceleration sensor according to a second embodiment, where the first rotor comb fingers of the first comb structure have different height than the first stator comb fingers of the first comb structure and where the second rotor comb fingers of the second comb structure have different height than the second stator comb fingers of the second comb structure.

In a first embodiment of the capacitive micromechanical acceleration sensor, which is illustrated in FIGS. 1 to 3, the first sensor of the capacitive micromechanical acceleration sensor comprises a first stator electrode 7a and a second stator electrode 7b and a rotor electrode 6 positioned between the first stator electrode 7a and the second stator electrode 7b.

In this first embodiment the rotor electrode 6 is rigidly attached between the second end 11 of the first beam 8 and the second end 15 of the second beam 12 so that the rotor electrode 6 extends perpendicularly with respect to the central axis A of the acceleration sensor. In this first embodiment the rotor electrode 6 is rigidly attached to the second end 11 of the first beam 8 at the second connection point 48 and rigidly attached to the second end 15 of the second beam 12 at the fourth connection point 50 so that the rotor electrode 6 extends perpendicularly with respect to the central axis A of the acceleration sensor.

Figure 12:
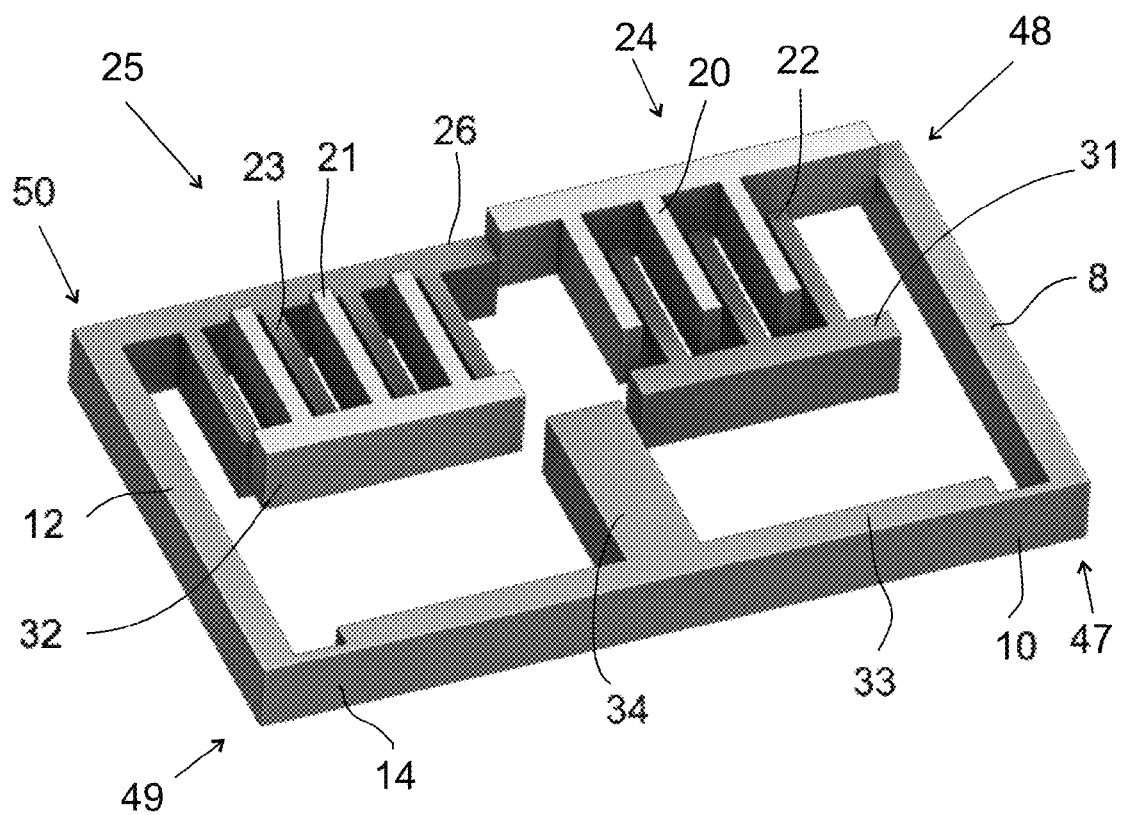
FIG. 12 show the rotor electrode support structure and the first and the second comb structure of first sensor in FIG. 10 and additionally how the first rotor comb fingers of the first comb structure and how the second rotor comb fingers of the second comb structure of the first sensor is supported at the rotor electrode support structure in the capacitive micromechanical acceleration sensor illustrated in FIG. 10.
Figure 13:
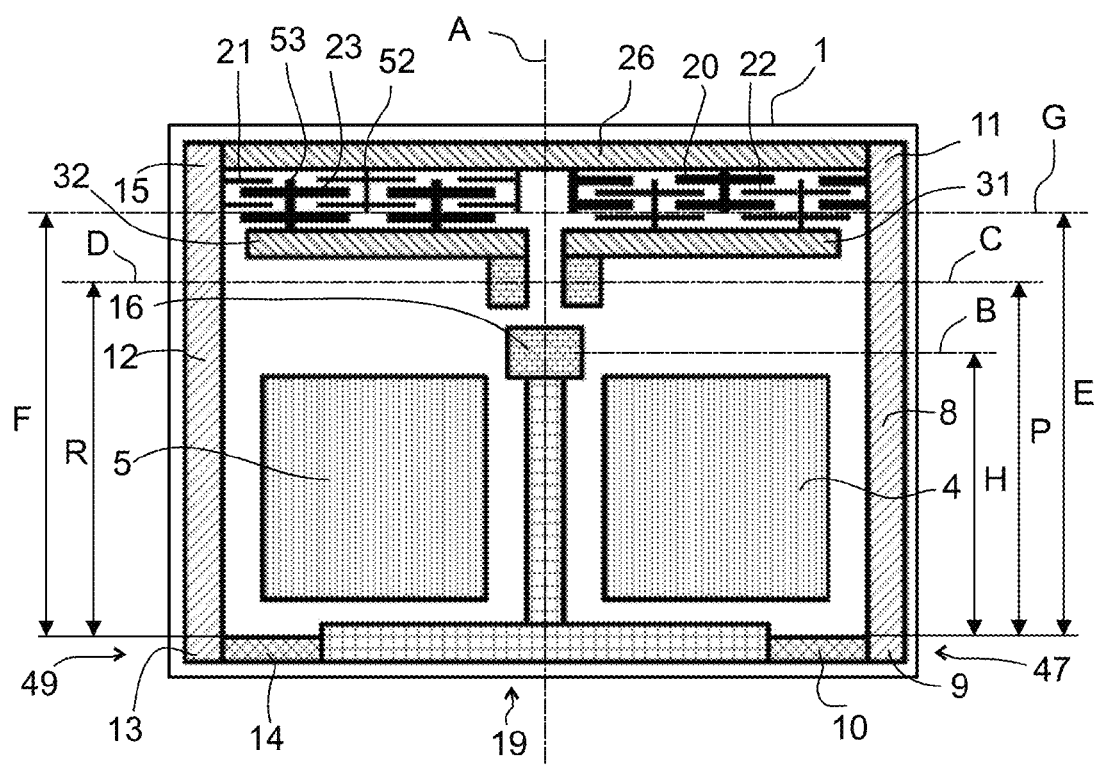
FIG. 13 is a top view of a capacitive micromechanical acceleration sensor according to a third embodiment.
Figure 14:
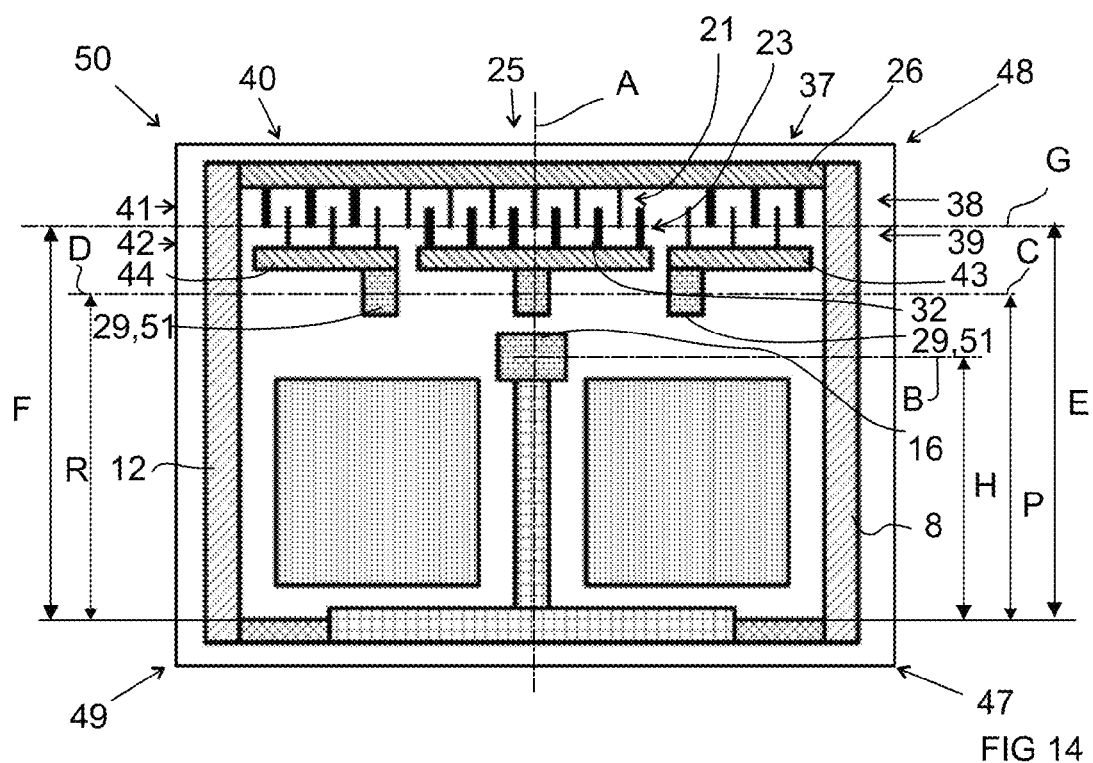
FIG. 14 is a top view of a capacitive micromechanical acceleration sensor according to a fourth embodiment where the first comb structure of the first sensor has been divided into a first comb structure section and into a second comb structure section.
Figure 15:
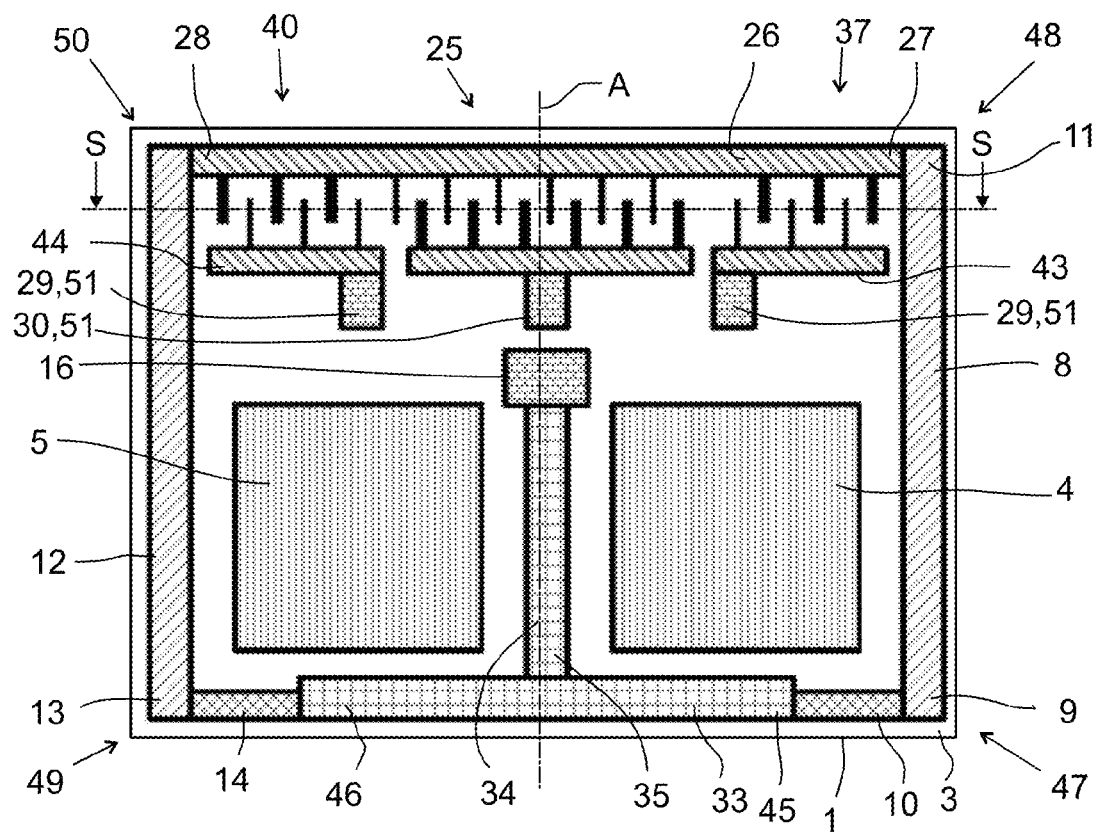
FIG. 15 shows an alternative configuration of the fourth embodiment shown in FIG. 14.
Figure 16:
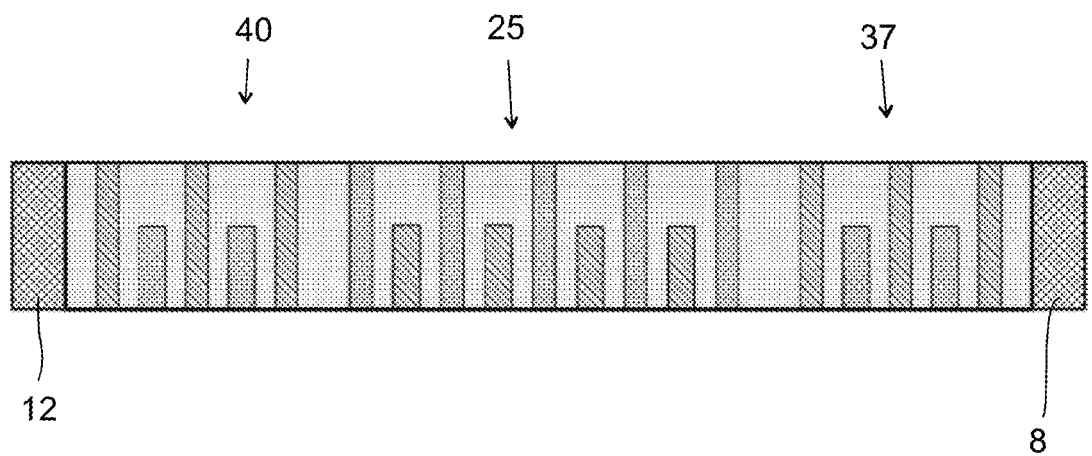
FIG. 16 shows the capacitive micromechanical acceleration sensor shown in FIG. 14 as cut along line S-S in FIG. 14.
Figure 17:
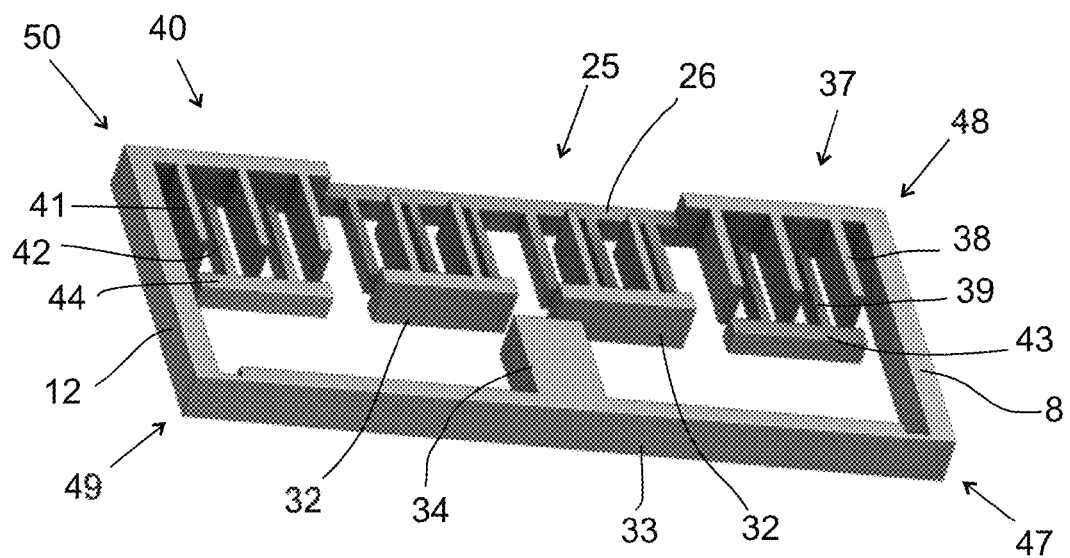
FIG. 17 show the rotor electrode support structure and the first and second rotor comb structure section and the second comb structure of first sensor in FIG. 14 and additionally how the first rotor comb finger structure section of the first comb structure section and how the second rotor comb finger structure section of the second comb structure section and how the second rotor comb fingers of the second comb structure of the first sensor is supported at the rotor electrode support structure in the capacitive micromechanical acceleration sensor illustrated in FIG. 14.
Figure 18:
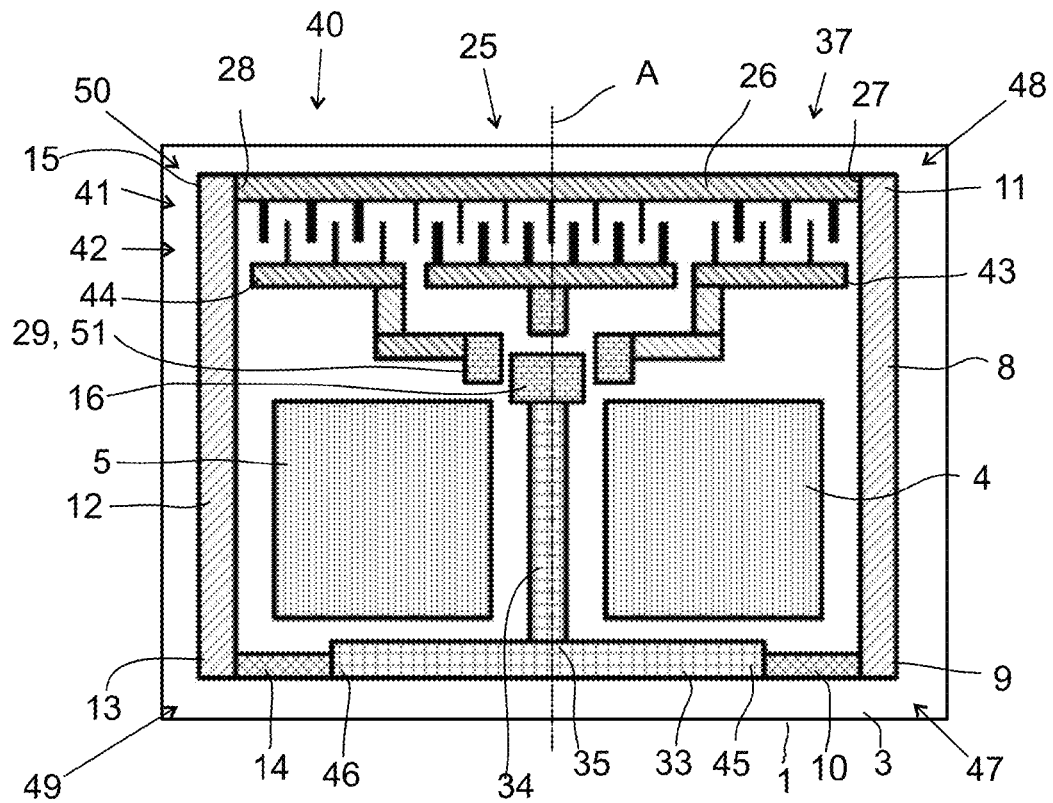
FIG. 18 is a top view of a capacitive micromechanical acceleration sensor according to a fifth embodiment.
Figure 19:
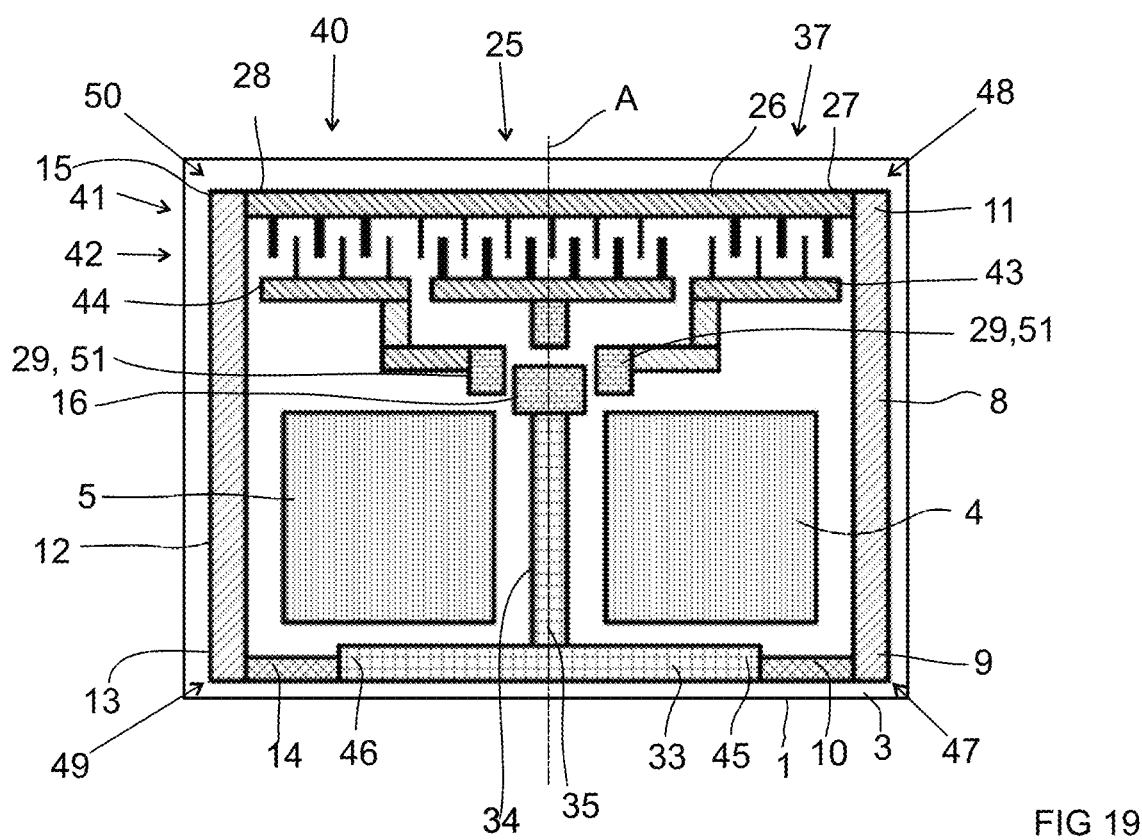
FIG. 19 shows an alternative configuration of the fifth embodiment shown in FIG. 18.

The rotor electrode 6 of the first sensor 2 of the capacitive micromechanical acceleration sensor may, as in the second embodiment of the capacitive micromechanical acceleration sensor that is illustrated in FIGS. 4 to 12, in the third embodiment of the capacitive micromechanical acceleration sensor that is illustrated in FIG. 13, in the fourth embodiment of the capacitive micromechanical acceleration sensor that is illustrated in FIGS. 14 to 17, and in the fifth embodiment of the capacitive micromechanical acceleration sensor that is illustrated in FIGS. 18 and 19, comprise first rotor comb fingers 20 and second rotor comb fingers 21. In such embodiments the stator electrode 7 of the first sensor 2 comprises first stator comb fingers 22 for cooperation with the first rotor comb fingers 20 and second stator comb fingers 23 for cooperation with the second rotor comb fingers 21. The first rotor comb fingers 20 of the rotor electrode 6 and the first stator comb fingers 22 of the stator electrode 7 form a first comb structure 24 and the second rotor comb fingers 21 of the rotor electrode 6 and the second stator comb fingers 23 of the stator electrode 7 form a second comb structure 25. The first rotor comb fingers 20 of the first comb structure 24 and the second rotor comb fingers 21 of the second comb structure 25 are connected to a third beam 26 of the rotor electrode 6 of the first sensor 2. The third beam 26 has a first end 27 rigidly connected to the second end 11 of the first beam 8 at the second connection point 48. The third beam 26 having a second end 28 rigidly connected to the second end 15 of the second beam 12 at the fourth connection point 50. The third beam 26 extends perpendicularly to the central axis A of the acceleration sensor. The first stator comb fingers 22 of the first comb structure 24 are connected to a fourth beam 31 of the stator electrode 7 of the first sensor 2, which fourth beam 31 extends perpendicularly to the central axis A of the acceleration sensor. The second stator comb fingers 23 of the second comb structure 25 are connected to a fifth beam 32 of the stator electrode 7 of the first sensor 2, which fifth beam 32 extends perpendicularly to the central axis A of the acceleration sensor.

If the capacitive micromechanical acceleration sensor comprises such first comb structure 24 and such second comb structure 25, the first rotor comb fingers 20 of the first comb structure 24 and the second rotor comb fingers 21 of the second comb structure 25 may be connected to the third beam 26 so that the first rotor comb fingers 20 of the first comb structure 24 and the second rotor comb fingers 21 of the second comb structure 5 extend in parallel with the central axis A of the acceleration sensor, and the first stator comb fingers 22 of the first comb structure 24 may be connected to the fourth beam 31 so that the first stator comb fingers 22 of the first comb structure 24 extend in parallel with the central axis A of the acceleration sensor, and the second stator comb fingers 23 of the second comb structure 25 may be connected to the fifth beam 32 so that the second stator comb fingers 23 of the second comb structure 25 extend in parallel with the central axis A of the acceleration sensor. Such embodiments are illustrated in FIGS. 4 to 12 and in FIGS. 14 to 19.

If the capacitive micromechanical acceleration sensor comprises such first comb structure 24 and such second comb structure 25, the first rotor comb fingers 20 of the first comb structure 24 and the second rotor comb fingers 21 of the second comb structure 25 may be connected to the third beam 26 so that the first rotor comb fingers 20 of the first comb structure 24 and the second rotor comb fingers 21 of the second comb structure 25 extend perpendicularly to the central axis A of the acceleration sensor, and the first stator comb fingers 22 of the first comb structure 24 may be connected to the fourth beam 31 so that the first stator comb fingers 22 of the first comb structure 24 extend perpendicularly to the central axis A of the acceleration sensor, and the second stator comb fingers 23 of the second comb structure 25 may be connected to the fifth beam 32 so that the second stator comb fingers 23 of the second comb structure 25 extend perpendicularly to the central axis A of the acceleration sensor. Such embodiment is illustrated in FIG. 13. In FIG. 13 the first rotor comb fingers 20 and second rotor comb fingers 21 are fastened to the third beam 26 by rotor finger supports 52. In FIG. 13 the first stator comb fingers 22 are fastened to the fourth beam 31 by stator finger supports 53. In FIG. 13 the second stator comb fingers 23 are fastened to the fifth beam 32 by stator finger supports 53.

If the capacitive micromechanical acceleration sensor comprises such first comb structure 24 and such second comb structure 25, the fourth beam 31 may be rigidly anchored to the substrate 1 at a stator anchoring point 51 in the form of a first stator anchoring point 29 and the fifth beam 32 may be rigidly anchored to the substrate 1 at a stator anchoring point 51 in the form of a second stator anchoring point 30. The position of this first stator anchoring point 29 and this second anchoring point 30 is preferably, but not necessarily, dependent on the position of the rotor anchoring point 16 for anchoring the rotor electrode support structure 19 rigidly anchored to the substrate 1 in the following manner: The rotor electrode support structure 19 is rigidly anchored to the substrate 1 at a rotor anchoring point 16. The rotor anchoring point 16 is located at a first imaginary line B perpendicular to the central axis A of the acceleration sensor and the rotor electrode 6 is located touching and in relation to the first connection point 47 behind a second imaginary line G perpendicular to the central axis A of the acceleration sensor. The fourth beam 31 is rigidly anchored to the substrate 1 at a stator anchoring point 51 in the form of a first stator anchoring point 29 that is located at a third imaginary line C perpendicular to the central axis A of the acceleration sensor. A distance P between the first connection point 47 and the third imaginary line C is over 50%, preferably over 66%, of the distance E between the first connection point 47 and the second imaginary line G, when the distance P and the distance E are measured in a direction parallel to the central axis A of the acceleration sensor. The fifth beam 32 is rigidly anchored to the substrate 1 at a stator anchoring point 51 in the form of a second stator anchoring point 30 that is located at a fourth imaginary line D perpendicular to the central axis A of the acceleration sensor. A distance R between the third connection point 49 and the fourth imaginary line D being over 50%, preferably over 66%, of the distance F between the third connection point 49 and the second imaginary line G, when the distance R and the distance F are measured in a direction parallel to the central axis A of the acceleration sensor.

If the capacitive micromechanical acceleration sensor comprises such first comb structure 24 and such second comb structure 25, the fourth beam 31 may be rigidly anchored to the substrate 1 at a stator anchoring point 51 in the form of a first stator anchoring point 29 that is located at a third imaginary line C perpendicular to the central axis A of the acceleration sensor in such manner that a distance P between the first connection point 47 and the third imaginary line C is between 50 and 150%, preferably between 66 and 125%, more preferably between 75 and 90% of the distance E between the first connection point 47 and the second imaginary line G, when the distance P and the distance E are measured in a direction parallel to the central axis A of the acceleration sensor.

If the capacitive micromechanical acceleration sensor comprises such first comb structure 24 and such second comb structure 25, the fifth beam 32 may be rigidly anchored to the substrate 1 at a stator anchoring point 51 in the form of a second stator anchoring point 30 that is located at a fourth imaginary line D perpendicular to the central axis A of the acceleration sensor in such manner that a distance R between the third connection point 49 and the fourth imaginary line D is between 50 and 150%, preferably between 66 and 125%, more preferably between 75 and 90% of the distance F between the third connection point 49 and the second imaginary line G, when the distance R and the distance F are measured in a direction parallel to the central axis A of the acceleration sensor.

The stator anchoring point 51 in the form of the first stator anchoring point 29 is preferably, but not necessarily, located closer to the central axis A of the acceleration sensor than to the first beam 8 along the third imaginary line C.

If the capacitive micromechanical acceleration sensor comprises such first comb structure 24 and such second comb structure 25, the fourth beam 31 is preferably, but not necessarily, rigidly anchored to the substrate 1 at a stator anchoring point 51 in the form of a first stator anchoring point 29 that is located along the third imaginary line C between the second sensor 4 and the central axis A of the acceleration sensor.

The stator anchoring point 51 in the form of the second anchoring point 30 is preferably, but not necessarily, located closer to the central axis A of the acceleration sensor than to the second beam 12 along the fourth imaginary line D.

The stator anchoring point 51 in the form of the second anchoring point 30 is preferably, but not necessarily, located closer to the central axis A of the acceleration sensor than to the second beam 12 along the fourth imaginary line D.

If the capacitive micromechanical acceleration sensor comprises such first comb structure 24 and such second comb structure 25, the fifth beam 32 is preferably, but not necessarily, rigidly anchored to the substrate 1 at a stator anchoring point 51 in the form of a second anchoring point 30 that is located along the fourth imaginary line D between the third sensor 5 and the central axis A of the acceleration sensor.

If the capacitive micromechanical acceleration sensor comprises a rotor anchoring point 16 and a stator point 51 as described earlier, the rotor anchoring point 16 and the stator point 51 such as the first stator anchoring point 29 and the second stator anchoring point 30 are preferably, but not necessarily, located essentially at the same location.

Figure 5:
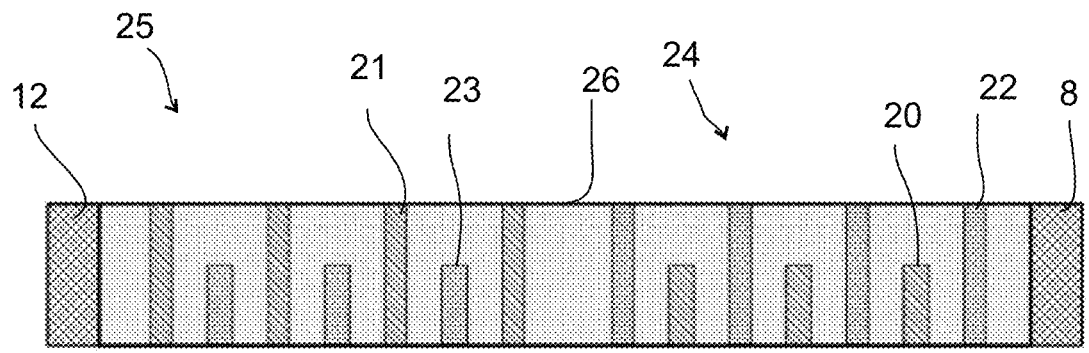
FIG. 5 shows the capacitive micromechanical acceleration sensor shown in FIG. 4 as cut along line V-V in FIG. 4.
Figure 6:
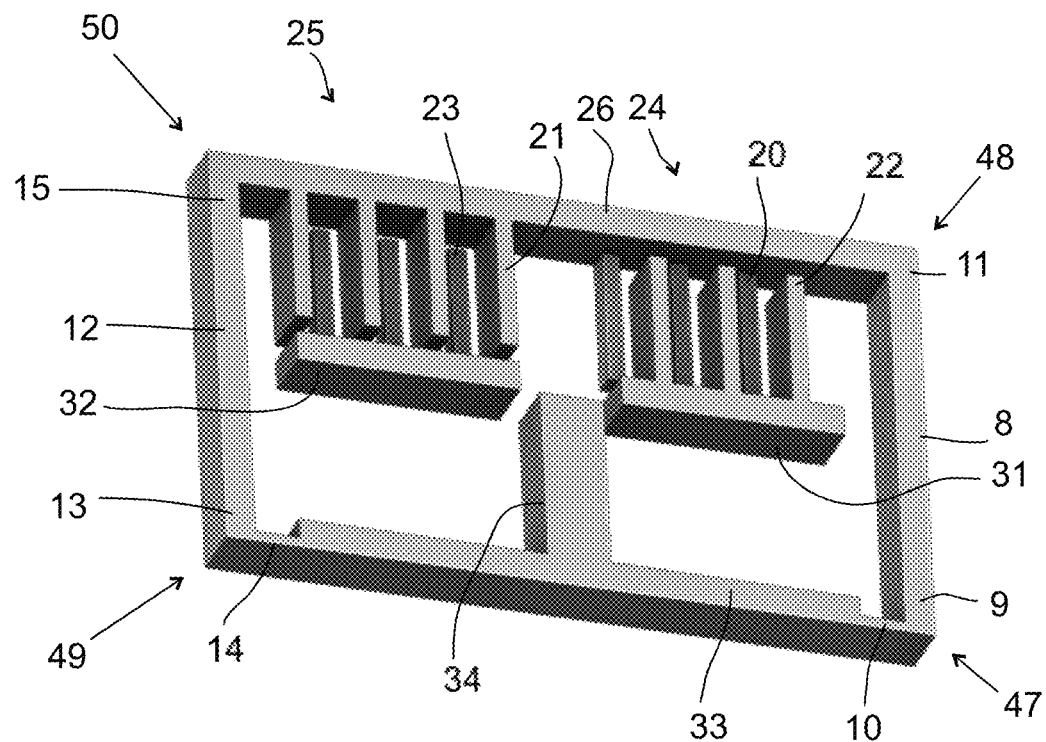
FIG. 6 show the rotor electrode support structure and the first and the second comb structure of first sensor in FIG. 4 and additionally how the first rotor comb fingers first of the first comb structure and how the second rotor comb fingers of the second comb structure of the first sensor is supported at the rotor electrode support structure in the capacitive micromechanical acceleration sensor illustrated in FIG. 4.
Figure 7:
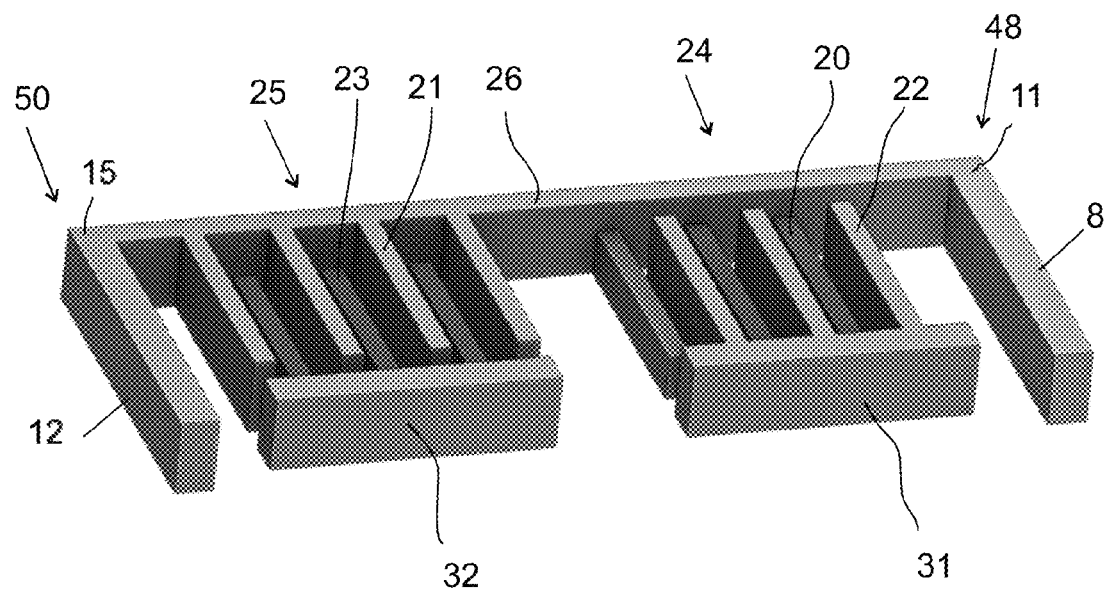
FIG. 7 show the first and the second comb structure of first sensor in FIG. 4.
Figure 8:
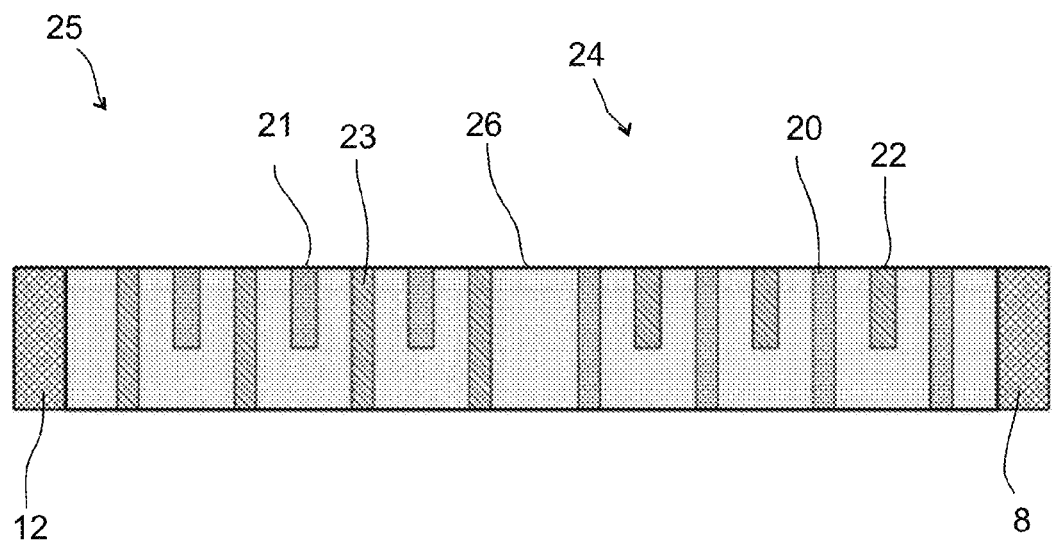
FIG. 8 shows an alternative configuration to the structure shown in FIG. 5.
Figure 9:
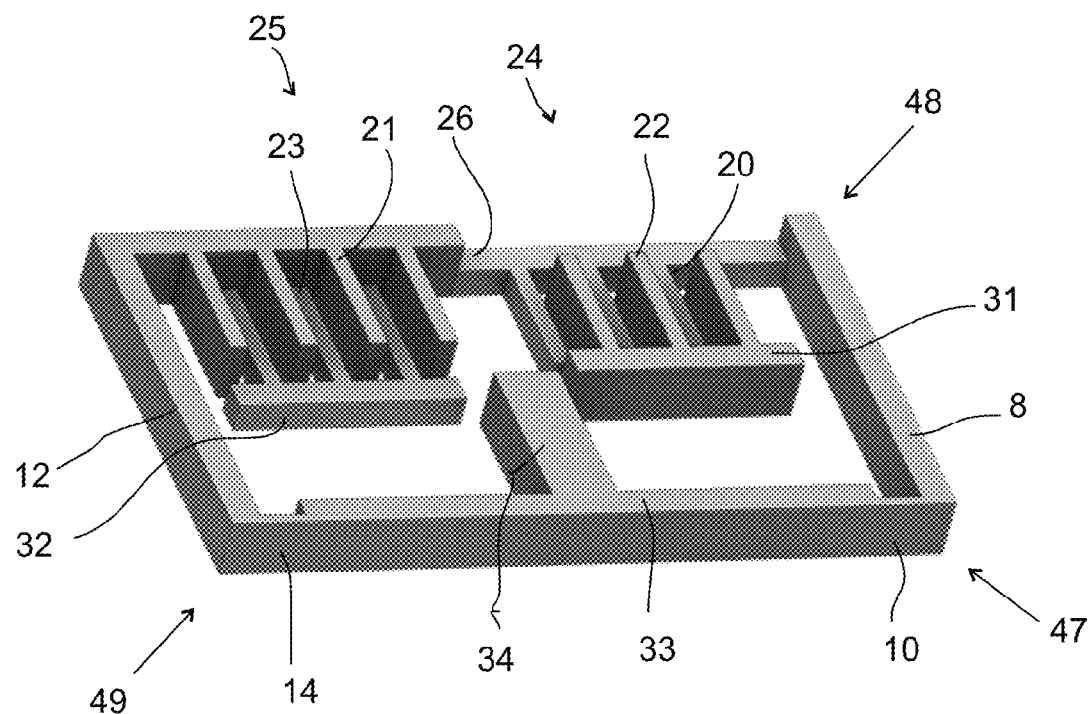
FIG. 9 shows an alternative configuration to the structure shown in FIG. 6.
Figure 10:
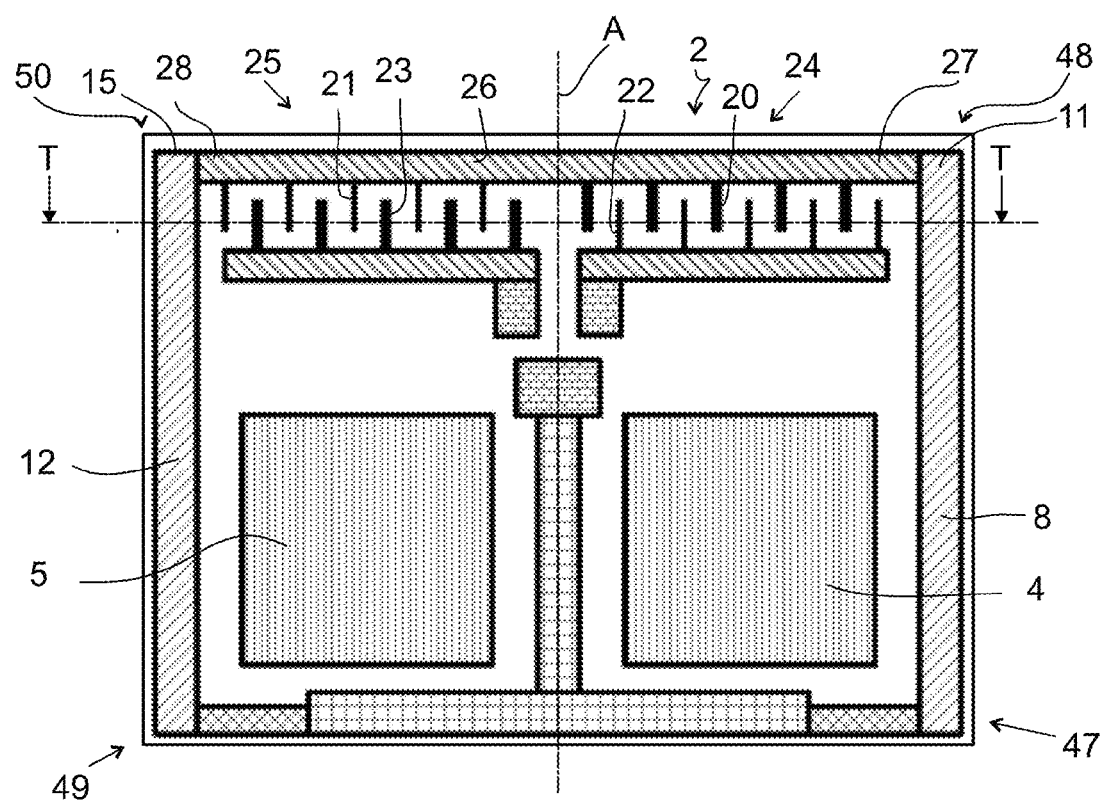
FIG. 10 shows an alternative configuration of the second embodiment shown in FIGS. 4 to 6, in which alternative configuration the first rotor comb fingers of the first comb structure and the first stator comb fingers of the first comb structure have the same height but they are located at different distances from the plane of the substrate and in which alternative configuration the second rotor comb fingers of the second comb structure and the second stator comb fingers of the second comb structure have the same height but they are located at different distances from the plane of the substrate.
Figure 11:
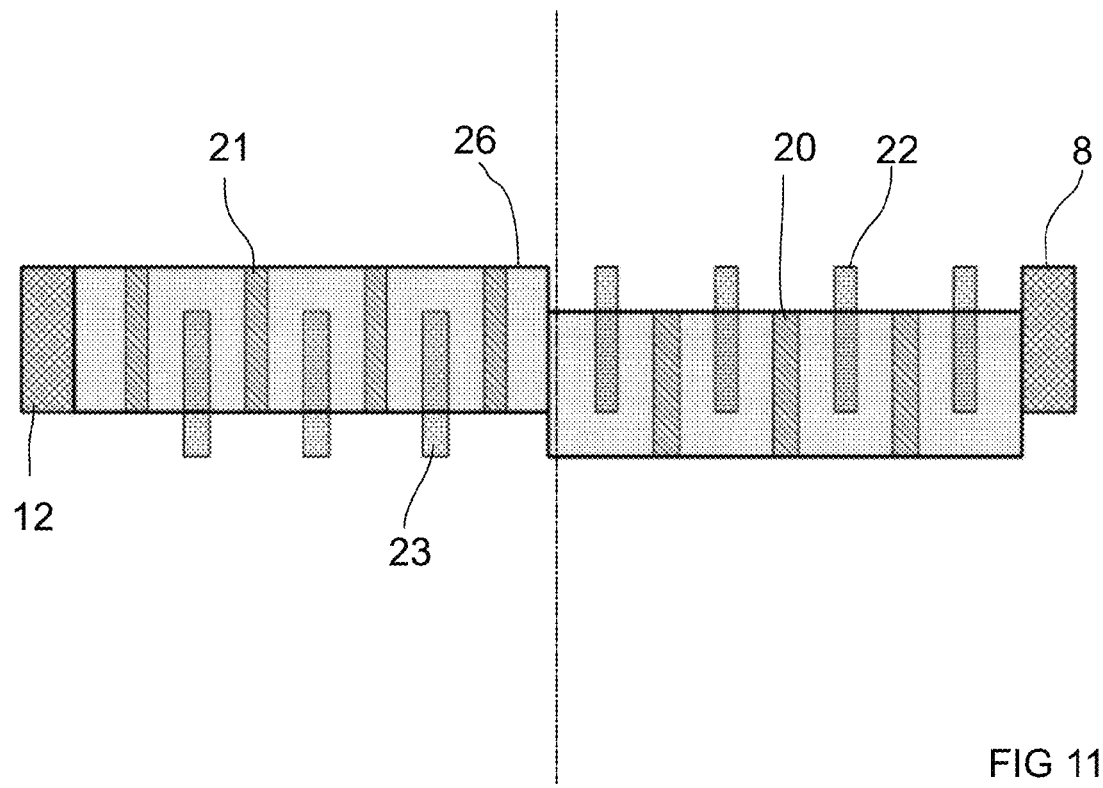
FIG. 11 shows the capacitive micromechanical acceleration sensor shown in FIG. 10 as cut along line T-T in FIG. 10.

If the capacitive micromechanical acceleration sensor comprises such first comb structure 24 and such second comb structure 25, the first rotor comb fingers 20 of the first comb structure 24 may, as shown in FIGS. 5 to 7, have a height in the direction perpendicular to the plane 3 of the substrate 1 that is lower than the height of the first stator comb fingers 22 of the first comb structure 24 in the direction perpendicular to the plane 3 of the substrate 1, and the second rotor comb fingers 21 of the second comb structure 25 may have a height in the direction perpendicular to the plane 3 of the substrate 1 that is higher than the height of the second stator comb fingers 23 of the second comb structure 25 in the direction perpendicular to the plane 3 of the substrate 1.

If the capacitive micromechanical acceleration sensor comprises such first comb structure 24 and such second comb structure 25, the first rotor comb fingers 20 of the first comb structure 24 may have a height in the direction perpendicular to the plane 3 of the substrate 1 that is higher than the height of the first stator comb fingers 22 of the first comb structure 24 in the direction perpendicular to the plane 3 of the substrate 1, and the second rotor comb fingers 21 of the second comb structure 25 may have a height in the direction perpendicular to the plane 3 of the substrate 1 that is lower than the height of the second stator comb fingers 23 of the second comb structure 25 in the direction perpendicular to the plane 3 of the substrate 1.

If the capacitive micromechanical acceleration sensor comprises such first comb structure 24 and such second comb structure 25, the first rotor comb fingers 20 and the first stator comb fingers 22 of the first comb structure 24 may, as shown in FIGS. 12 and 13, have essentially the same height in the direction perpendicular to the plane 3 of the substrate 1, so that the first rotor comb fingers 20 of the first comb structure 24 are located at a greater distance from the substrate 1 than the first stator comb fingers 22 of the first comb structure 24, and the second rotor comb fingers 21 and the second stator comb fingers 23 of the second comb structure 25 may have essentially the same height in the direction perpendicular to the plane 3 of the substrate 1, so that the second rotor comb fingers 21 of the second comb structure 25 are located at a smaller distance from the substrate 1 than the second stator comb fingers 23 of the second comb structure 25.

If the capacitive micromechanical acceleration sensor comprises such first comb structure 24 and such second comb structure 25, the first rotor comb fingers 20 and the first stator comb fingers 22 of the first comb structure 24 may have essentially the same height in the direction perpendicular to the plane 3 of the substrate 1, so that the first rotor comb fingers 20 of the first comb structure 24 are located at a smaller distance from the substrate 1 than the first stator comb fingers 22 of the first comb structure 24, and the second rotor comb fingers 21 and the second stator comb fingers 23 of the second comb structure 25 have essentially the same height in the direction perpendicular to the plane 3 of the substrate 1, so that the second rotor comb fingers 21 of the second comb structure 25 are located at a greater distance from the substrate 1 than the second stator comb fingers 23 of the second comb structure 25.

If the capacitive micromechanical acceleration sensor comprises such first comb structure 24 and such second comb structure 25, the first rotor comb fingers 20 and the first stator comb fingers 22 of the first comb structure 24 are preferably, but not necessarily, vertical comb electrodes, and the second rotor comb fingers 21 and the second stator comb fingers 23 of the second comb structure 25 are preferably, but not necessarily, vertical comb electrodes. In such case the first rotor comb fingers 20 of the first comb structure 24 have preferably, but not necessarily, different thickness than the first stator comb fingers 22 of the first comb structure 24, and the second rotor comb fingers 21 of the second comb structure 25 have preferably, but not necessarily, different thickness than the second stator comb fingers 23 of the second comb structure 25.

The rotor electrode support structure 19 may comprise a sixth beam 33 that extends in a direction perpendicular to the central axis A of the acceleration sensor and a seventh beam 34 that is rigidly connected to the sixth beam 33 and that extends along the central axis A of the acceleration sensor. In such case the rotor electrode support structure 19 may be anchored to the substrate 1 from the seventh beam 34 at a rotor anchoring point 16 located as described earlier. In such case the rotor electrode support structure 19 may be anchored to the substrate 1 solely from the seventh beam 34 at a rotor anchoring point 16 located as described earlier. In such case the seventh beam 34 may have a first end 35 rigidly connected to the sixth beam 33 and an opposite second end 36, and the rotor electrode support structure 19 may be anchored to the substrate 1 from the seventh beam 34 in the region of the opposite second end 36 of the seventh beam 34 at a rotor anchoring point 16 located as described earlier. In such case the sixth beam 33 of the rotor electrode support structure 19 may have a first end 45 that is at the first connection point 47 connected to the first beam 8 at the first end 9 of the first beam 8 by the first spring structure 10, and the sixth beam 33 of the rotor electrode support structure 19 may have a second end 46 that is at the third connection point 49 connected to the second beam 12 at the first end 13 of the second beam 12 by means of the second spring structure 14.

In the capacitive micromechanical acceleration sensor, as in the fourth embodiment of the capacitive micromechanical acceleration sensor illustrated in FIGS. 14 to 17 and in the fifth embodiment of the capacitive micromechanical acceleration sensor illustrated in FIGS. 18 and 19, the first comb structure 24 may be divided into a first comb structure section 37 having a first rotor comb finger structure section 38 and a first stator comb finger structure section 39 and into a second comb structure section 40 having a second rotor comb finger structure section 41 and a second stator comb finger structure section 42. In such embodiment the second comb structure 25 is arranged symmetrically with respect to the central axis A of the acceleration sensor at the central axis A of the acceleration sensor. In such embodiment the first comb structure section 37 is arranged between the second comb structure 25 and the first beam 8. In such embodiment the second comb structure section 40 is arranged between the second comb structure 25 and the second beam 12.

If the capacitive micromechanical acceleration sensor comprises a first comb structure section 37 and a second comb structure section 40, the first rotor comb finger structure section 38 of first comb structure section 37, the second rotor comb finger structure section 41 of second comb structure section 40, and the second rotor comb fingers 21 of the second comb structure 25 may be connected to the third beam 26. In such embodiment the second rotor comb fingers 21 of the second rotor comb structure 25 forms a structure that is arranged symmetrically with respect to the central axis a of the acceleration sensor at the central axis A of the acceleration sensor. In such embodiments the first rotor comb finger structure section 38 of first comb structure section 37 is arranged between the second rotor comb fingers 21 of the second comb structure 25 and the first end 27 of the third beam 26 that is rigidly connected to the second end 11 of the first beam 8 at the second connection point 48. In such embodiments the second rotor comb finger structure section 41 of second comb structure section 40 is arranged between the second rotor comb fingers 21 and the second end 28 of the third beam 26 that is rigidly connected to the second end 15 of the second beam 12 at the fourth connection point 50. In such embodiment the fourth beam 31 is divided into a first fourth beam section 43 and into a second fourth beam section 44. In such embodiment the first stator comb finger structure section 39 of first comb structure section 37 is connected to the first fourth beam section 43. In such embodiment the second stator comb finger structure section 42 of second comb structure section 40 is connected to the second fourth beam section 44. In such embodiment the second stator comb fingers 23 of the second comb structure 25 together with the fifth beam 32 forms a structure arranged symmetrically with respect to the central axis A of the acceleration sensor at the central axis A of the acceleration sensor. In such embodiment the first stator comb finger structure section 39 of first comb structure section 37 together with the first fourth beam section 43 is arranged between the second comb structure 25 and the first beam 8. In such embodiment the second stator comb finger structure section 42 of second comb structure section 40 together with the second fourth beam section 44 is arranged between the second comb structure 25 and the second beam 12.

If the capacitive micromechanical acceleration sensor comprises a first fourth beam section 43 and a second fourth beam section 44 as described above, the first fourth beam section 43 may be rigidly anchored to the substrate 1 at stator anchoring point 51 in the form of a first stator anchoring point 29 and the second fourth beam section 44 may be rigidly anchored to the substrate 1 at stator anchoring point 51 in the form of a first stator anchoring point 29. The position of such first stator anchoring point 29 is preferably, but not necessarily, dependent on the position of the rotor anchoring point 16 for anchoring the rotor electrode support structure 19 rigidly anchored to the substrate 1 in the following manner: The rotor electrode support structure 19 is rigidly anchored to the substrate 1 at a rotor anchoring point 16. The rotor anchoring point 16 is located at a first imaginary line B perpendicular to the central axis A of the acceleration sensor and the rotor electrode 6 being located touching and in relation to the first connection point 47 behind a second imaginary line G perpendicular to the central axis A of the acceleration sensor. The first fourth beam section 43 is rigidly anchored to the substrate 1 at a stator anchoring point 51 in the form of a first stator anchoring point 29 that is located at a third imaginary line C perpendicular to the central axis A of the acceleration sensor and the second fourth beam section 44 is rigidly anchored to the substrate 1 at a stator anchoring point 51 in the form of a first stator anchoring point 29 that is located at a third imaginary line C perpendicular to the central axis A of the acceleration sensor. A distance P between the between the first connection point 47 and the third imaginary line C is over 50%, preferably over 66%, of the distance E between the first connection point 47 and the second imaginary line G, when the distance P and the distance E are measured in a direction parallel to the central axis A of the acceleration sensor. Such first stator anchoring points 29 are preferably, but not necessarily, located closer to the central axis A of the acceleration sensor than to the first beam 8 respectively to the second beam 12. The distance P between the between the first connection point 47 and the third imaginary line C may alternatively be between 50 and 150%, preferably between 66 and 125%, more preferably between 75 and 90% of the distance E between the first connection point 47 and the second imaginary line G, when the distance P and the distance E are measured in a direction parallel to the central axis A of the acceleration sensor. Such first stator anchoring points 29 are preferably, but not necessarily, located closer to the central axis A of the acceleration sensor than to the first beam 8 respectively to the second beam 12.

If the capacitive micromechanical acceleration sensor comprises a first fourth beam section 43 and a second fourth beam section 44 and a third beam 26, such as in the third embodiment and the fourth embodiment, the first fourth beam section 43 is preferably, but not necessarily, parallel with the third beam 26 and the second fourth beam section 44 is preferably, but not necessarily, parallel with the third beam 26.

The first beam 8 and the second beam 12 have preferably, but not necessarily, equal length.

The first spring structure 10 and second spring structure 14 comprise preferably, but not necessarily, a seesaw structure.

The second sensor 4 comprises preferably, but not necessarily, at least one comb structure.

The third sensor 5 comprises preferably, but not necessarily, at least one comb structure.

It is apparent to a person skilled in the art that as technology advanced, the basic idea of the invention can be implemented in various ways. The invention and its embodiments are therefore not restricted to the above examples, but they may vary within the scope of the claims.

LIST OF REFERENCE NUMERALS

1. Substrate
2. First sensor
3. Plane
4. Second sensor
5. Third sensor
6. Rotor electrode
7. Stator electrode
8. First beam
9. First end of first beam
10. First spring structure
11. Second end of first beam
12. Second beam
13. First end of second beam
14. Second spring structure
15. Second end of second beam
16. Rotor anchoring point
17. First space
18. Second space
19. Rotor electrode support structure
20. First rotor comb fingers
21. Second rotor comb fingers
22. First stator comb fingers
23. Second stator comb fingers
24. First comb structure
25. Second comb structure
26. Third beam
27. First end of third beam
28. Second end of third beam
29. First stator anchoring point
30. Second stator anchoring point
31. Fourth beam
32. Fifth beam
33. Sixth beam
34. Seventh beam
35. First end of seventh beam
36. Second end of seventh beam
37. First comb structure section
38. First rotor comb finger structure section
39. First stator comb finger structure section
40. Second comb structure section
41. Second rotor comb finger structure section
42. Second stator comb finger structure section
43. First fourth beam section
44. Second fourth beam section
45. First end of sixth beam
46. Second end of sixth beam
47. First connection point
48. Second connection point
49. Third connection point
50. Fourth connection point
51. Stator anchoring point
52. Rotor finger supports
53. Stator finger supports

The invention claimed is:

1. A capacitive micromechanical acceleration sensor, comprising:
    a substrate,
    a first sensor configured to measure acceleration along a z-axis perpendicular to a plane of the substrate;
    a second sensor configured to measure acceleration along an x-axis or y-axis or x- and y-axis parallel to the plane of the substrate; and
    a third sensor configured to measure acceleration along an y-axis or x-axis or x- and y-axis parallel to the plane of the substrate and perpendicular to the x-axis,
    wherein the first sensor comprises a rotor electrode and stator electrode, and
    wherein the rotor electrode is movably anchored to the substrate at a rotor anchoring point,
    said capacitive micromechanical acceleration sensor further comprising:
    a first beam having a first end connected at a first connection point by a first spring structure to a rotor electrode support structure that is anchored to the substrate and a second end that is connected at a second connection point to the rotor electrode of the first sensor;
    a second beam having a first end connected at a third connection point by a second spring structure to the rotor electrode support structure that is anchored to the substrate and a second end that is connected at a fourth connection point to the rotor electrode of the first sensor, wherein the first beam and the second beam are parallel with a central axis of the acceleration sensor, the second sensor is situated in a first space circumscribed by the first beam, the first sensor, the rotor electrode support structure, and the central axis of the acceleration sensor, and wherein the third sensor is situated in a second space circumscribed by the second beam, the first sensor, the rotor electrode support structure, and the central axis of the acceleration sensor.

2. The capacitive micromechanical acceleration sensor according to claim 1, wherein the stator electrode is anchored to the substrate at a stator anchoring point.

3. The capacitive micromechanical acceleration sensor according to claim 1, wherein the rotor electrode support structure is rigidly anchored to the substrate at a rotor anchoring point, the rotor anchoring point is located at a first imaginary line perpendicular to the central axis of the acceleration sensor, the rotor electrode is located touching and in relation to the first connection point behind a second imaginary line perpendicular to the central axis of the acceleration sensor, and wherein a distance H between the first connection point and the first imaginary line is over 50% of a distance E between the first connection point and the second imaginary line, when the distance H and the distance E are measured in a direction parallel with the central axis of the acceleration sensor.

4. The capacitive micromechanical acceleration sensor according to claim 3, wherein the distance H between the first connection point and the first imaginary line is over 66% of a distance E between the first connection point and the second imaginary line, when the distance H and the distance E are measured in a direction parallel with the central axis of the acceleration sensor.

5. The capacitive micromechanical acceleration sensor according to claim 1, wherein the rotor electrode of the first sensor comprises first rotor comb fingers and second rotor comb fingers, the stator electrode of the first sensor comprises first stator comb fingers and second stator comb fingers, the first rotor comb fingers of the rotor electrode and the first stator comb fingers of the stator electrode forms a first comb structure, the second rotor comb fingers of the rotor electrode and the second stator comb fingers of the stator electrode forms a second comb structure, the first rotor comb fingers of the first comb structure and the second rotor comb fingers of the second comb structure is connected to a third beam of the rotor electrode of the first sensor, the third beam has a first end rigidly connected to the second end of the first beam at the second connection point, the third beam has a second end rigidly connected to the second end of the second beam at the fourth connection point, the third beam is perpendicular to the central axis of the acceleration sensor, the first stator comb fingers of the first comb structure are connected to a fourth beam of the stator electrode of the first sensor, the fourth beam extending perpendicularly to the central axis of the acceleration sensor, and wherein the second stator comb fingers of the second comb structure are connected to a fifth beam of the stator electrode of the first sensor, the fifth beam extending perpendicularly to the central axis of the acceleration sensor.

6. The capacitive micromechanical acceleration sensor according to claim 5, wherein the first rotor comb fingers of the first comb structure and the second rotor comb fingers of the second comb structure are connected to the third beam so that the first rotor comb fingers of the first comb structure and the second rotor comb fingers of the second comb structure extend in parallel with the central axis of the acceleration sensor, the first stator comb fingers of the first comb structure are connected to the fourth beam so that the first stator comb fingers of the first comb structure extend in parallel with the central axis of the acceleration sensor, and wherein the second stator comb fingers of the second comb structure are connected to the fifth beam so that the second stator comb fingers of the second comb structure extend in parallel with the central axis of the acceleration sensor.

7. The capacitive micromechanical acceleration sensor according to claim 5, wherein the first rotor comb fingers of the first comb structure and the second rotor comb fingers of the second comb structure are connected to the third beam so that the first rotor comb fingers of the first comb structure and the second rotor comb fingers of the second comb structure extend perpendicularly to the central axis of the acceleration sensor, the first stator comb fingers of the first comb structure are connected to the fourth beam so that the first stator comb fingers of the first comb structure extend perpendicularly to the central axis of the acceleration sensor, and wherein by the second stator comb fingers of the second comb structure are connected to the fifth beam so that the second stator comb fingers of the second comb structure extend perpendicularly to the central axis of the acceleration sensor.

8. The capacitive micromechanical acceleration sensor according to claim 5, wherein the rotor electrode support structure is rigidly anchored to the substrate at a rotor anchoring point, the rotor anchoring point is located at a first imaginary line perpendicular to the central axis of the acceleration sensor, the rotor electrode is located touching and in relation to the first connection point behind a second imaginary line perpendicular to the central axis of the acceleration sensor, the fourth beam is rigidly anchored to the substrate at a stator anchoring point in the form of a first stator anchoring point that is located at a third imaginary line perpendicular to the central axis of the acceleration sensor, a distance P between the first connection point and the third imaginary line is over 50% of the distance E between the first connection point and the second imaginary line, when the distance P and the distance E are measured in a direction parallel to the central axis of the acceleration sensor, the fifth beam is rigidly anchored to the substrate at a stator anchoring point in the form of a second stator anchoring point that is located at a fourth imaginary line perpendicular to the central axis of the acceleration sensor, and wherein a distance R between the third connection point and the fourth imaginary line is over 50% of the distance F between the third connection point and the second imaginary line, when the distance R and the distance F are measured in a direction parallel to the central axis of the acceleration sensor.

9. The capacitive micromechanical acceleration sensor according to claim 8, wherein the first stator anchoring point is located closer to the central axis of the acceleration sensor than to the first beam along the third imaginary line.

10. The capacitive micromechanical acceleration sensor according to claim 8, wherein the second stator anchoring point is located closer to the central axis of the acceleration sensor than to the second beam along the fourth imaginary line.

11. The capacitive micromechanical acceleration sensor according to claim 8, wherein the distance P between the first connection point and the third imaginary line is over 66% of the distance E between the first connection point and the second imaginary line, when the distance P and the distance E are measured in a direction parallel to the central axis of the acceleration sensor.

12. The capacitive micromechanical acceleration sensor according to claim 8, wherein the distance R between the third connection point and the fourth imaginary line is over 66% of the distance F between the third connection point and the second imaginary line, when the distance R and the distance F are measured in a direction parallel to the central axis of the acceleration sensor.

13. The capacitive micromechanical acceleration sensor according to claim 5, wherein the first rotor comb fingers of the first comb structure have a height in the direction perpendicular to the plane of the substrate that is lower than the height of the first stator comb fingers of the first comb structure in the direction perpendicular to the plane of the substrate, and wherein the second rotor comb fingers of the second comb structure have a height in the direction perpendicular to the plane of the substrate that is higher than the height of the second stator comb fingers of the second comb structure in the direction perpendicular to the plane of the substrate.

14. The capacitive micromechanical acceleration sensor according to claim 5, wherein the first rotor comb fingers of the first comb structure have a height in the direction perpendicular to the plane of the substrate that is higher than the height of the first stator comb fingers of the first comb structure in the direction perpendicular to the plane of the substrate, and wherein the second rotor comb fingers of the second comb structure have a height in the direction perpendicular to the plane of the substrate that is lower than the height of the second stator comb fingers of the second comb structure in the direction perpendicular to the plane of the substrate.

15. The capacitive micromechanical acceleration sensor according to claim 5, wherein the first rotor comb fingers and the first stator comb fingers of the first comb structure have essentially the same height in the direction perpendicular to the plane of the substrate, the first rotor comb fingers of the first comb structure are located at a greater distance from the substrate than the first stator comb fingers of the first comb structure, the second rotor comb fingers and the second stator comb fingers of the second comb structure have essentially the same height in the direction perpendicular to the plane of the substrate, and wherein the second rotor comb fingers of the second comb structure are located at a smaller distance from the substrate than the second stator comb fingers of the second comb structure.

16. The capacitive micromechanical acceleration sensor according to claim 5, wherein the first rotor comb fingers and the first stator comb fingers of the first comb structure have essentially the same height in the direction perpendicular to the plane of the substrate, the first rotor comb fingers of the first comb structure are located at a smaller distance from the substrate than the first stator comb fingers of the first comb structure, the second rotor comb fingers and the second stator comb fingers of the second comb structure have essentially the same height in the direction perpendicular to the plane of the substrate, and wherein the second rotor comb fingers of the second comb structure are located at a greater distance from the substrate than the second stator comb fingers of the second comb structure.

17. The capacitive micromechanical acceleration sensor according to claim 5, wherein the first rotor comb fingers and the first stator comb fingers of the first comb structure are vertical comb electrodes, and wherein the second rotor comb fingers and the second stator comb fingers of the second comb structure are vertical comb electrodes.

18. The capacitive micromechanical acceleration sensor according to claim 17, wherein the first rotor comb fingers of the first comb structure have different thickness than the first stator comb fingers of the first comb structure, and wherein the second rotor comb fingers of the second comb structure have different thickness than the second stator comb fingers of the second comb structure.

19. The capacitive micromechanical acceleration sensor according to claim 5, wherein the first comb structure are divided into a first comb structure section having a first rotor comb finger structure section and a first stator comb finger structure section and into a second comb structure section having a first rotor comb finger structure section and a first stator comb finger structure section, the second comb structure are arranged symmetrically with respect to the central axis of the acceleration sensor at the central axis of the acceleration sensor, the first comb structure section are arranged between the second comb structure and the first beam, and wherein the second comb structure section are arranged between the second comb structure and the second beam.

20. The capacitive micromechanical acceleration sensor according to claim 19, wherein the first rotor comb finger structure section of the first comb structure section, the second rotor comb finger structure section of the second comb structure section, and the second rotor comb fingers of the second comb structure are connected to the third beam, the second rotor comb fingers of the second comb structure form a structure arranged symmetrically with respect to the central axis of the acceleration sensor at the central axis of the acceleration sensor, the first rotor comb finger structure section of first comb structure section is arranged between the second rotor comb fingers of the second comb structure and the first end of the third beam that is rigidly connected to the second end of the first beam at the second connection point, the second rotor comb finger structure section of second comb structure section is arranged between the second rotor comb fingers and the second end of the third beam that is rigidly connected to the second end of the second beam at the fourth connection point, the fourth beam is divided into a first fourth beam section and into second fourth beam section, the first stator comb finger structure section of first comb structure section being connected to the first fourth beam section, the second stator comb finger structure section of second comb structure section is connected to the second fourth beam section, the second stator comb fingers of the second comb structure together with the fifth beam form a structure arranged symmetrically with respect to the central axis of the acceleration sensor at the central axis of the acceleration sensor, the first stator comb finger structure section of first comb structure section together with the first fourth beam section are arranged between the second stator comb fingers of the second comb structure and the first beam, and wherein the first stator comb finger structure section of second comb structure section together with the second fourth beam section are arranged between the second stator comb fingers of the second comb structure and the second beam.

21. The capacitive micromechanical acceleration sensor according to claim 20, wherein the first fourth beam section is parallel with the third beam, and wherein the second fourth beam section is parallel with the third beam.

22. The capacitive micromechanical acceleration sensor according to claim 20, wherein the rotor electrode support structure is rigidly anchored to the substrate at a rotor anchoring point, the rotor anchoring point is located at a first imaginary line perpendicular to the central axis of the acceleration sensor, the rotor electrode is located touching and in relation to the first connection point behind a second imaginary line perpendicular to the central axis of the acceleration sensor, the first fourth beam section is rigidly anchored to the substrate at a stator anchoring point in the form of a first stator anchoring point that is located at a third imaginary line perpendicular to the central axis of the acceleration sensor and the second fourth beam section is rigidly anchored to the substrate at a stator anchoring point in the form of a first stator anchoring point that is located at a third imaginary line perpendicular to the central axis of the acceleration sensor, and wherein a distance P between the between the first connection point and the third imaginary line is over 50% of the distance E between the first connection point and the second imaginary line, when the distance P and the distance E are measured in a direction parallel to the central axis of the acceleration sensor.

23. The capacitive micromechanical acceleration sensor according to claim 22, wherein the distance P between the between the first connection point and the third imaginary line is over 66% of the distance E between the first connection point and the second imaginary line, when the distance P and the distance E are measured in a direction parallel to the central axis of the acceleration sensor.

24. The capacitive micromechanical acceleration sensor according to claim 1, wherein the rotor electrode support structure comprises a sixth beam extends perpendicularly to the central axis of the acceleration sensor and a seventh beam that is rigidly connected to the sixth beam and that extends along the central axis of the acceleration sensor.

25. The capacitive micromechanical acceleration sensor according to claim 24, wherein the rotor electrode support structure is anchored to the substrate from the seventh beam at the rotor anchoring point.

26. The capacitive micromechanical acceleration sensor according to claim 24, wherein the rotor electrode support structure is anchored to the substrate solely from the seventh beam at the rotor anchoring point.

27. The capacitive micromechanical acceleration sensor according to claim 24, wherein the seventh beam has a first end rigidly connected to the sixth beam and an opposite second end, and wherein the rotor electrode support structure is anchored to the substrate from the seventh beam at the rotor anchoring point in the region of the opposite second end of the seventh beam.

28. The capacitive micromechanical acceleration sensor according to claim 24, wherein the sixth beam of the rotor electrode support structure has a first end that is at the first connection point connected to the first beam at first end of the first beam by means of the first spring structure, and wherein the sixth beam of the rotor electrode support structure has a second end that is at the third connection point connected to the second beam at the first end of the second beam means of the second spring structure.

29. The capacitive micromechanical acceleration sensor according to claim 1, wherein the rotor anchoring point and the stator anchoring point(s) are located essentially at the same location.

30. The capacitive micromechanical acceleration sensor according to claim 1, wherein the first beam and the second beam have equal length.

31. The capacitive micromechanical acceleration sensor according to claim 1, wherein the distance between the first connection point and the second connection point is essentially the same as the distance between the third connection point and the fourth connection point.

32. The capacitive micromechanical acceleration sensor according to claim 1, wherein the second sensor comprises at least one comb structure.

33. The capacitive micromechanical acceleration sensor according to claim 1, wherein the third sensor comprises at least one comb structure.

* * * * *